United States Patent [19]

Oliver et al.

[11] Patent Number: 4,634,637
[45] Date of Patent: Jan. 6, 1987

[54] SOLAR CONTROL FILM

[75] Inventors: Dell B. Oliver, Gilbert; Peter Jahoda, Chandler, both of Ariz.

[73] Assignee: Gila River Products, Inc., Chandler, Ariz.

[21] Appl. No.: 801,084

[22] Filed: Nov. 22, 1985

[51] Int. Cl.[4] .......................... B32B 15/08; B32B 7/02
[52] U.S. Cl. .................................. 428/622; 428/624; 428/626; 428/638; 428/209; 428/215; 428/458; 428/393; 428/394; 428/395; 428/480
[58] Field of Search ................ 428/622, 624, 626, 638

[56] References Cited

U.S. PATENT DOCUMENTS

| | | | |
|---|---|---|---|
| 3,078,693 | 2/1963 | Lytlo | 65/60 |
| 3,290,203 | 12/1966 | Antonson et al. | 161/4 |
| 3,305,336 | 2/1967 | Browne et al. | 65/60 |
| 3,398,040 | 8/1968 | Allen et al. | 161/45 |
| 3,414,503 | 12/1968 | Brichard | 204/298 |
| 3,499,697 | 3/1970 | Edwards | 350/1 |
| 3,798,146 | 3/1974 | Wan et al. | 204/192 |
| 3,907,660 | 9/1975 | Gillery | 204/298 |
| 3,949,134 | 4/1976 | Willdorf | 428/215 |
| 3,956,559 | 5/1976 | Wildorf | 428/214 |
| 3,984,591 | 10/1976 | Plumat et al. | 427/165 |
| 4,102,768 | 7/1978 | Kearin et al. | 204/192 |
| 4,112,171 | 9/1978 | Motter et al. | 428/213 |
| 4,157,417 | 6/1979 | Murphy | 428/344 |
| 4,226,910 | 10/1980 | Dahlen et al. | 428/336 |
| 4,247,599 | 1/1981 | Hopper | 428/458 |
| 4,504,553 | 3/1985 | Aubert et al. | 428/622 |
| 4,546,050 | 10/1985 | Amberger et al. | 428/638 |
| 4,563,400 | 1/1986 | Criss | 428/638 |

Primary Examiner—Veronica O'Keefe
Attorney, Agent, or Firm—Charles E. Cates; James H. Phillips; Victor Myer

[57] ABSTRACT

To a sheet of oriented polyethylene terephthalate a layer of nickel chrome alloy with an optical density of approximately 60% is applied by conventional vacuum deposition. To this sheet a subsequent stripe layer of stainless steel at 35% is applied by vacuum deposition down the center portion of the web which yields a combined optical density of approximately 21% over the center area. This first sheet is then laminated with a suitable optically clear adhesive to a second sheet of oriented polyethylene terephthalate incorporating a center portion which includes a nickel chrome stripe with an optical density of approximately 35% applied by conventional vacuum deposition. The resulting composite exhibits a vignette pattern of dark (optical density 7 to 12%) to light optical density 50 to 70% (from center to edge). A suitable optically clear mounting adhesive is then applied. When desired, the finished laminate contains a layer of clear PET which has been coated with a hard coat, i.e., a scratch resistant coat of any of the types already known to the art. If desired, one or more of the PET layers and/or laminating adhesive layers may include dye impregnation or layers of applied dye.

10 Claims, 1 Drawing Figure

SOLAR CONTROL FILM

BACKGROUND OF THE INVENTION

This invention relates to solar control window film, more particularly to such film for retrofitting windows of motor vehicles, and it is an object of the invention to provide an improved solar control film of this nature.

Solar control film of the general type involved here is disclosed in the applicant's prior application, Ser. No. 655,336, entitled "Solar Control Window Film", filed on Sept. 27, 1984, and reference may be had to said application for further consideration of the prior art relating to solar control window films and the like. Solar control window film as described in the said application included one layer of an optically clear polymeric film with a metallization layer of a nickel chromium alloy deposited on one face thereof by conventional vacuum deposition, which polymeric stratum was then laminated to a second polymeric stratum which was dye impregnated or had a layer of dye applied thereto. The metallization layer of nickel chromium alloy was vignetted so that the transmittance of visible light varied from a low value of about 35% at the top of the solar control film to a transmittance of about 60% at the bottom of the film, all with a reflectance of visible light of no more than about 35%.

DESCRIPTION OF THE PRIOR ART

Window film for motor vehicle windows, which film was dyed in a vignette pattern to admit relatively little light above the sightline and was shaded down to clear film below the driver or passenger's sightline, was first introduced for use in original equipment laminated windshield glass and was the subject of U.S. Patents issued to Ryan, U.S. Pat. Nos. 2,609,269; 2,636,420 and 2,639,687. The film was dipped in an appropriate dye for a controlled time to produce a gradient from dark to light, which will be referred to hereinafter as a vignette, and the film was sandwiched between panes of glass to make a safety windshield.

More recently, polymeric film useful for retrofit application to existing motor vehicle windows has been introduced to the automotive after market.

Wildorf, for example, in U.S. Pat. Nos. 3,775,226 and 3,891,486 has a well rounded discussion of the prior art retrofit window film, and describes a typical prior solar control film comprising a polymeric sheet, a vapor deposited aluminum coat, a protective polymeric coat, and a pressure sensitive coat which is deactivated initially by the presence of an agent that eliminates tack during storage, as well as during the time the film is being applied to the window, etc. Wildorf shows a laminated sequence of a moisture permeable polymeric stratum, a bonding stratum, a vapor deposited aluminum stratum, and a second moisture permiable polymeric stratum. All of these strata, except the aluminum stratum, are optically clear and transparent. The polymeric strata are made of a polyester such as polyethylene terephthalate. The vapor deposited aluminum stratum referred to is produced by controlled density, vapor vacuum deposition upon the surface of polymeric stratum, which produces a uniform thickness of metal. The polymeric strata range in thickness from one-quarter mil to one mil, preferably one-half mil. The vapor deposited aluminum has a thickness of no more than three hundred angstrom units and is characterized by a light transmission of 5% to 60%. It goes on to explain a preferred adhesive in thicknesses from 0.1 to 0.3 mil.

Wildorf discloses as a preferred transparent polymeric film—a polyester—for this laminate, a biaxially oriented polyethylene terephthalate. Other polymers which can be made into suitable film include polyvinyl fluoride, polyvinylidene fluoride, polycarbonates, polystyrene, polymethyl, methacrylate, polyamides, ionomers, etc. as well as esters and mixed esters of cellulose, and stabilizers against degradation caused by ultraviolet light may be included if desired. Film may also be made of a polymer of monomers consisting of essentially lower alkaline monomers; acrylonitrile, and polyethylene, polypropylene and polyacrylonitrile. Wildorf '486 and '226 also suggest that a colorant, preferably dye may be put in the adhesive stratum. Wildorf's adhesive stratum is cast from a keytonic and/or alcoholic solution of the thermal setting polymer or acrylic. The solution preferably being applied to the clear film prior to superposing of the two polymeric films in the formation of the final product. For example, a polyester is Mylar, the acrylic is a methyl and/or ethylmethacrylate, the keytone is methylethyl and the alcohol is toluol.

Wildorf, U.S. Pat. No. 3,956,559 says his film has a pleasant soft gray color that permits excellent visibility (This is the natural color of aluminum on film, if looking through the film. Looking at the film, the impression is mirror-like). In other alternative embodiments, Wildorf says that the polyester strata may be polyethylene terephthalate layers impregnated with fade resistant azo dyes.

Burger, U.S. Pat. No. 4,095,013 and Wildorf 3,949,134 show the use of a cling adhesive.

The conventional prior art method of depositing metal on polymeric film is vacuum deposition because it is faster, it is dependable, and it is inexpensive. A special kind of vacuum deposition of metal involves the sputtering method, which is substantially more expensive. For the purpose of this application, vacuum deposition other than sputtering will be referred to as conventional vacuum deposition.

In the retrofit automotive film industry, the conventional wisdom prior to the said application Ser. No. 655,336 was that a composite film metallized by conventional vacuum deposition process could not be used on a vehicle because presenting the metallized surface to the outside world produced an unacceptable glare to persons outside the vehicle, and presenting the metallized surface to the inside of the vehicle created hazardous glare or mirror effect to the occupant. In consideration of the glare factor, it was also thought necessary to put very low limits on the density of the metallic layer on the film. Consequently, the prior art constructions prior to said application placed the metal to the inside facing the interior and at very low density. In the said prior art thinking and structures, the degree of opacity to visible light transmission required to be effective in conventional vacuum metallizing of polymeric film would have made the metal layer so highly reflective as to be unacceptable.

In 1981 an additional constraint on allowable values of reflectivity was imposed, and visible light reflectivity of greater than 35% was banned by VESC 20. VESC is an enforcement branch created by the AAMVA, a voluntary association of state safety agencies and industry whose membership is dedicated to highway safety. Its members include all U.S. states and its standards become law in many states. Prior to said application, composite films could not be made to conform to the reflectivity constraints with less than 45% transmission using conventional vacuum deposition techniques, although some success with sputtering exotic metals has been achieved. However, sputtering is a much more expensive method.

In the prior art to said application, a light transmission on the order of 20-30%, for example, implied a reflectivity of 80%-70%, respectively.

As Used Herein:

"High metal density" implies less than about 45% light transmission and implies unacceptable glare. "Low metal density" implies light transmission greater than about 45%.

"Conventional vacuum deposition of metal" includes resistive and conductive vacuum metallization and excludes sputtering.

"Unacceptable reflectance" means greater than about 35%.

"PET" means polyethylene terephthalate.

"Dye" includes dyes generally, pigments and transparent metal oxides unless otherwise required by the content.

"Vignette" means a layer of substance tapering from thick to thin or non-existent which results in a visual effect from dark to light and includes achieving this effect by discrete stripes.

Briefly, as indicated above, the said prior patent application Ser. No. 655,336 disclosed that by applying a metal layer, by conventional vacuum deposition, using a metal that deposited at a density great enough to reduce the transmission of visible light to less than about 45%, reflects no more than about 35% of the visible light, to a first stratum of polymeric film which stratum was in turn bonded to a second dye-treated polymeric stratum having a light transmission value greater than 35%, a composite film having a light transmission value in the area above the driver's line of sight of less than 35% and reflectivity of less than 35% was obtained. In the preferred embodiment, the area of greatest density was at the top of the window and tapered off in a vignette to low density below the sight line.

An additional and unexpected benefit was that the metal could then be positioned outwardly of the useful area of the dye where it serves to protect the sensitive dye in the adhesive layer or dyed plastic film from fading.

More specifically in the said prior application, it was disclosed that a first sheet of PET, to which a layer of an alloy of nickel:chromium, for example, 85:15, was applied by means of conventional vacuum deposition, was laminated to a film of PET impregnated with dye. Alternatively, the polyester could have been coated with a laminating adhesive impregnated with a dye, or pigment, or a combination of the two. Any suitable dye or pigment could have been used in the adhesive. Examples of dyes are known to the prior art and available. Preferred is a polyester adhesive impregnated with a very finely ground carbon black which appears gray in use.

Further the laminate was finished by applying a hard coat, i.e., a scratch resistant coat of any of the types already known to the art. The laminate was prepared for mounting on a vehicle window by any well-known adhesive mounting means.

All of the above film embodiments were within the value limits specified and were adhered to the inside surface of a motor vehicle window and positioned with a metal layer exterior (relative to the motor vehicle interior) to the dye to make a motor vehicle solar controlled window structure.

It was found that many of the dyes used in the dye impregnated layer, and in some instances the laminating adhesive included the dye material, deteriorated with passing time due to ultraviolet radiation and/or other factors.

It is a further object of the invention to overcome the disadvantages of the prior art.

It is a still further object of the invention to create a composite film that has an area of very low light transmittance, as low as 10% for example (a high density), and no greater than 35% reflectivity, by means of conventional vacuum deposition of metal utilizing two or more layers of metallization on polymer films.

BRIEF DESCRIPTION OF THE INVENTION

Essentially the invention comprises the use of two or more metallization layers of nickel chrome alloy, stainless steel and the like applied by conventional vacuum deposition, at least one of the layers being in a vignette pattern, are used.

In carrying out the invention in one form there is provided a flexible, solar control, composite sheet for use on the inside surface of a motor vehicle window comprising a first optically clear polymeric stratum having a layer of an alloy of nickel and chromium applied by conventional vacuum deposition to one of its surfaces and having a stripe of stainless steel applied by conventional vacuum deposition over the nickel chromium layer to one edge of the first polymeric stratum, the nickel chromium alloy layer having a density great enough to reduce the visible light transmission value to about 50-70% and the stainless steel stripe having a density great enough to give a combined visible light transmission with the nickel chromium layer of about 21%; a second optically clear polymeric stratum having a stripe of an alloy of nickel and chromium applied by conventional vacuum deposition along one side to one edge of the second stratum and having a density great enough to reduce the visible light transmission value through the striped portion to about 35%; the first polymeric stratum being bonded to the second polymeric stratum with the stripe of stainless steel and the stripe of nickel chromium alloy next to and facing each other, the light transmission value of the stainless steel nickel chromium stripe with the nickel chromium layer being about 8 to 12%, the bonding comprising an optically clear adhesive; and an optically clear adhesive layer for mounting the composite sheet with the second polymeric stratum to the inside surface of a motor vehicle window.

BRIEF DESCRIPTION OF THE DRAWING

For a more complete understanding of the invention reference should be had to the accompanying drawing in which the single FIGURE shows a sectional, or end, view of a composite sheet of film embodying the invention.

DESCRIPTION OF THE PREFERRED EMBODIMENT

Figure 1:
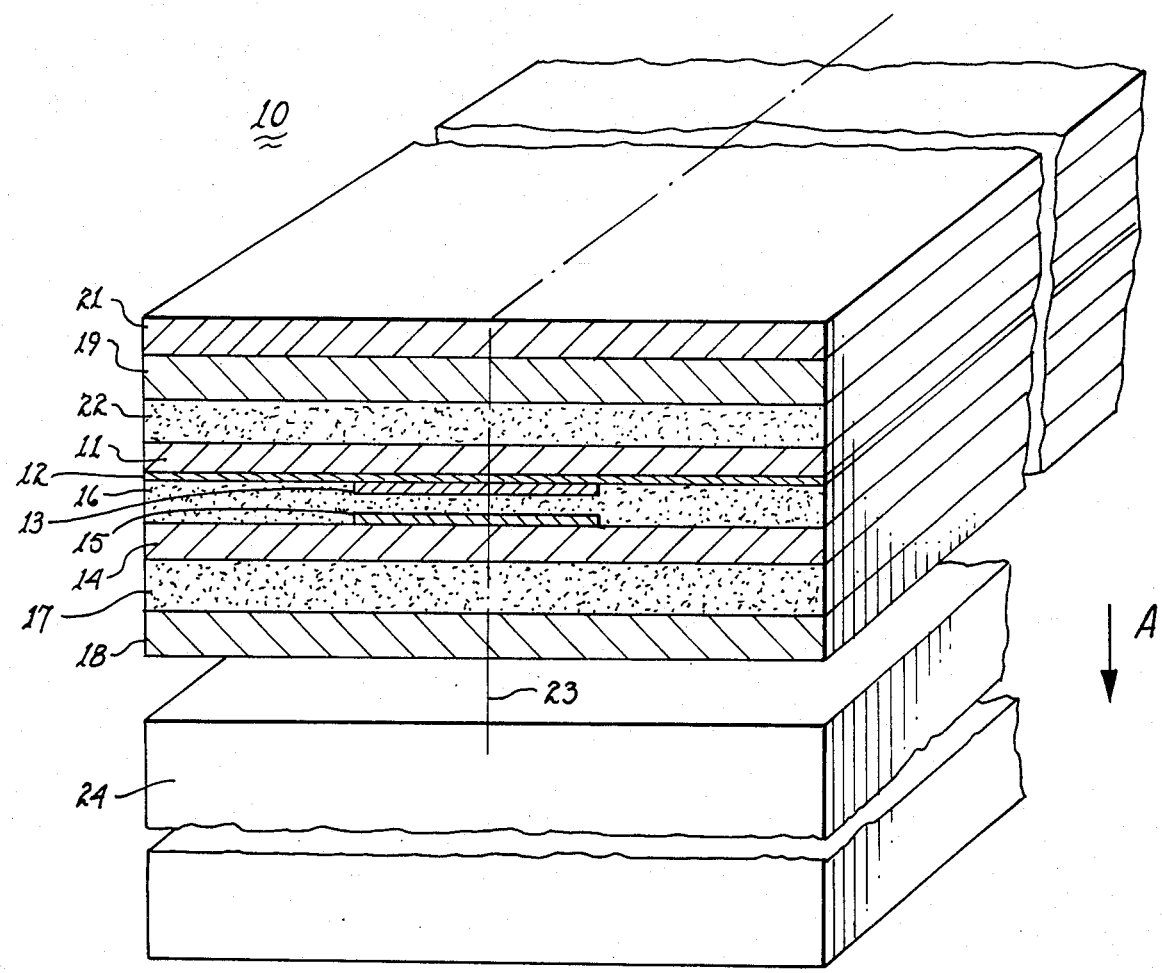

Referring to the drawing there is shown a diagrammatic sectional view of a sheet of film 10 embodying the invention.

As shown the layer of film 10 comprises a polymeric stratum 11 which for example, could be polyethylene terephthalate, PET, to which a thin metallization layer 12 of an alloy of nickel chromium has been applied by conventional vacuum deposition, a center stripe 13, or metallization layer, of stainless steel also applied by conventional vacuum deposition, a second polymeric stratum 14, for example, polyethylene terephthalate, PET, to which a center stripe metallization 15 of nickel chromium alloy has been applied by conventional vacuum deposition. The first polymeric stratum 11 and the second polymeric stratum 14 are laminated together by an optically clear laminating adhesive layer 16 with the stainless steel metallization stripe 12 facing and lying next to the nickel chromium metallization stripe 15. A suitable optically clear mounting adhesive layer 17 is then applied followed by a removable liner or release layer 18.

When desired the finished laminate may include a layer 19 of clear polyethylene terephthalate, PET, which has been coated with a hard coat, i.e., a scratch resistant coat 21 of any of the types well known to the market, the layer 19 being laminated to the layer 11 by a suitable laminating adhesive layer 22.

When completed the sheet of composite film is severed along the center shown by phantom line 23 to give two pieces of composite film which pieces are then cut into the necessary lengths and shaped for adhering to the inside of automobile window glass. It will be understood that the combined metallization layers 15, 16 will be at the top of the window or windshield for decreased light transmittance in this area.

The nickel chrome alloy layer 12 is applied with sufficient thickness of about 20–50 angstrom units to give an optical density of approximately 60%. That is to say 60% of the incident light is transmitted. The stainless steel stripe 13 is applied with sufficient thickness of about 50–100 angstrom units to provide an optical density of about 35% on its own in the area of the stainless steel stripe or approximately 21% in combination with the nickel chromium layer 12. When combined with the nickel chrome alloy layer 15 which has a thickness of about 50–100 angstrom units to give it an optical density of approximately 35%, the resulting composite exhibits an optical density of 7 to 12%, that is a light transmission of 7 to 12% in this area. The area of the film away from the nickel chrome alloy stripe 15 has an optical density of approximately 60% whereby the combined film exhibits a vignette pattern varying from 7 to 12% optical density at the area of the stainless steel stripe 15 to about 60% at the lower portion of the combined film where only the nickel chromium layer 12 inhibits light transmission. It will be understood that the composite film when applied to the window or windshield of an automobile that portion of the film including the nickel chrome stripe 15 and the stainless steel stripe 13 will be at the top of the window or windshield.

The effect of the metallized layers 12, 13 and 15, a high density, as a barrier to undesired visible light is retained without the unacceptable high visual light reflectance that would be expected for that density and thickness of metal prior to the said patent application.

The adhesive layer 16 bonds the polymer strata 11 and 14, with an optically clear, laminating adhesive. The metal film layer 12 may be nickel chromium alloy in the proportion of 85:15. Other proportions may be used if desired, for particular circumstances. The metal film layer 13 comprises stainless steel deposited by conventional vacuum deposition.

The presently preferred polymeric film for the strata 11 and 14 for metallizing may be obtained from Imperial Chemical Company under the trademark ICI-442, and from American Hoechst under the trademark Hostaphan 5000. The hardcoat layer 21 may be a scratch and abrasion resistant material such as cured organopolysiloxane compound. The methods of metallizing polymeric film, the adhesives and other means adjoining film to film and mounting film on window glass are all well-known to the art and no claim to such elements per se are made in this invention other than in combination with the other elements here disclosed and claimed whereby the invention is considered as a whole.

The laminating adhesives presently preferred to joining layers 11 and 14 are polyester resins made by DuPont under the trademark Eplam and by Morton Chemical Company whose stock number is 76R-36.

Adhesive layer 17 is protected by release liner 18 until the laminate 10 is ready for mounting on motor vehicle window glass 24. At that time the release liner 18 (shown unremoved in the single FIGURE) is peeled away and the laminate 10 is mounted on glass 24 by means of a 0.25 to 1.0 mil thickness layer of adhesive 17. Any of a family of acrylic or polyester resins may be used as mounting adhesive. The presently preferred resin is National 80-1057. Another useful adhesive is Monsanto's RA-1159.

In the FIGURE, the arrow A points to the outside of the motor vehicle. The film is mounted on the inside of the window, and appears from the drawing the metal layers are mounted to the exterior side relative to the film layer 11.

The two polymer films 11 and 14 and the various metallization films thereon are laminated together by the laminating adhesive 16 forming a composite with the hard coating 21 being on one of the outer surfaces. The non-hard coated surface of stratum 14 was then coated with a pressure sensitive mounting adhesive 17 combined to a protective silicone liner 18 with the silicone coated side facing the adhesive.

As indicated above, the total composite was then slit in half as shown by the phantom line 23 at the center of the band. The edges were trimmed at the same time to produce at about 20 inch finished product with the vignette on one edge.

The metallization layer 12 applied to the sheet 11 of oriented polyethylene terephthalate by conventional vacuum deposition has a low optical density of approximately 60%, for example from 50% to 70%. To this sheet a subsequent striped layer 13 of stainless steel is applied by vacuum deposition down the center portion of the web of sufficient thickness to yield a combined high optical density of approximately 21% over the center area. The nickel chrome stripe 15 is applied by vacuum deposition with a high optical density of approximately 35%. Thus the resulting composite exhibits a vignette pattern of dark (optical density 7 to 12%) to light (optical density 50 to 70%) from center to edge.

As used herein the term optical density means the percentage of light that is transmitted by the metallization. Thus a 60% optical density means that 60% of visible light is transmitted.

It may thus be understood that the stainless steel stripe 13 in combination with the layer of nickel chrome 12 giving a 21% visible light transmission will have that visible light transmission decreased by the 35% transmission factor of the nickel chrome stripe 13 thus giving a total visible light transmission of 35%×35%×60% or about 7.3%, this being at the upper part of the window glass or windshield, for example. In the area where only the nickel chrome metallization 12 is subjected to the visible light the optical density of 60% applies which is to say 60% of the visible light is transmitted through this portion of the glass or windshield.

Metallic film 12 of an alloy of nickel chrome 85:15 as described, while transmitting approximately 60% of the visible light, will reflect no more than about 35% of that light which is within the standards set by VESC. At the same time in the area of the stainless steel stripe 13 and the nickel chrome stripe 15 the transmission of visible light is in the vicinity of 7 to 12% thereby eliminating glare from the eyes of a driver, for example, while at the same time the visible light reflected to the exterior is no more than 35% also within the requirements of VESC.

If desired under some circumstances, one or more of the PET layers 11, 14 and 19 may include impregnation with a suitable dye or such dye may be included in one or more of the layers of laminating adhesive 16, 17 or 22.

Well known ultra violet radiation absorbers may be incorporated in the various PET layers or the adhesive layers.

It will be understood that by varying the optical density of the metallization layers differing percentages of light transmission may be achieved while at the same time restricting the reflectance to no more than 35% of the incident visible light.

While the vignetting has been described as being achieved by the discrete stripes of metallization 13 and 15 it will be understood that instead of discrete stripes the density of these layers may be varied from the center of the sheet toward the edge. In a typical roll (sheet) of polymer the sheet may be 40 inches wide and is metallized with a layer 12 across its full width while the stripes 13 and 15 may be in the order of 5 inches wide so that when the sheet is separated at the phantom line 23 the area of greatest optical density would be about 2½ inches on either side of the phantom line 23, that is to say the top 2½ inches of the glass or windshield to which the film is applied. In such case the optical density would vary from about 7 to 12% at the top to 60% at the bottom, the variations being possibly in the area of 7 to 12% at the top and 50 to 70% at the bottom.

The four micron thick hard coat 21 may be applied by a gravure coating process.

In some instances it may be feasible to place all three metallizations NiCr,12, stainless steel, 16, NiCr,15, atop each other on one polymer layer, for example, 11.

While a preferred combination has been described it will be understood that various modifications may be made in the parameters of thickness, kind of film and kind of adhesive as well as optical densities of the various metallizations without departing from the disclosure of the invention.

What is claimed is:

1. A flexible, solar control, composite sheet for use on the inside surface of a motor vehicle window comprising:
   a first optically clear polymeric stratum having a layer of an alloy of nickel and chromium applied by conventional vacuum deposition to one of its surfaces and having a stripe of stainless steel applied by conventional vaccum deposition over said nickel chromium layer at one edge of said first polymeric stratum, said nickel chromium alloy layer having a density great enough to reduce the visible light transmission value to about 50-70% and said stainless steel stripe having a density great enough to give a combined visible light transmission with said nickel chromium layer of about 21%;
   a second optically clear polymeric stratum having a stripe of an alloy of nickel and chromium applied by conventional vacuum deposition along one side to one edge of said second stratum and having a density great enough to reduce the visible light transmission value through the striped portion to about 35%;
   said first polymeric stratum being bonded to said second polymeric stratum with the said stripe of stainless steel and the said stripe of nickel chromium alloy next to and facing each other, the light transmission value of said stainless steel nickel chromium stripe with said nickel chromium layer being about 7 to 12%, said bonding comprising an optically clear adhesive; and
   an optically clear adhesive layer for mounting said composite sheet with said second polymeric stratum to the inside surface of a motor vehicle window.

2. The composite sheet of claim 1 wherein the bonding of said first and second polymer strata comprises an optically clear laminating adhesive.

3. The composite sheet of claim 1 wherein said alloy of nickel chromium comprises 85:15 nickel:chromium.

4. The composite sheet of claim 1 wherein said first and said second polymeric strata comprise polyethylene terephthalate.

5. The composite sheet of claim 4 including a third optically clear polyethylene terephthalate layer bonded with an optically clear adhesive to the exposed side of said first polymeric stratum and a scratch resistant hardcoat applied to said third layer.

6. The composite sheet of claim 5 wherein a removable liner is applied to said mounting adhesive.

7. The composite sheet of claim 1 wherein at least one of said first and second polymer strata and said laminating adhesive includes an ultra violet radiation absorber.

8. The composite sheet according to claim 2 wherein at least one of said first and second polymer layers and said laminating adhesive is dye impregnated.

9. The composite sheet according to claim 1 wherein said nickel chromium alloy layer has a density great enough to reduce the visible light transmission value to about 60%.

10. The composite sheet according to claim 1 wherein said stripe of stainless steel and said stripe of nickel chromium alloy are in a vignette pattern.

* * * * *